Oct. 26, 1926.
E. H. R. BARTON
1,604,799
EXTRUDING MACHINE
Filed June 26, 1922
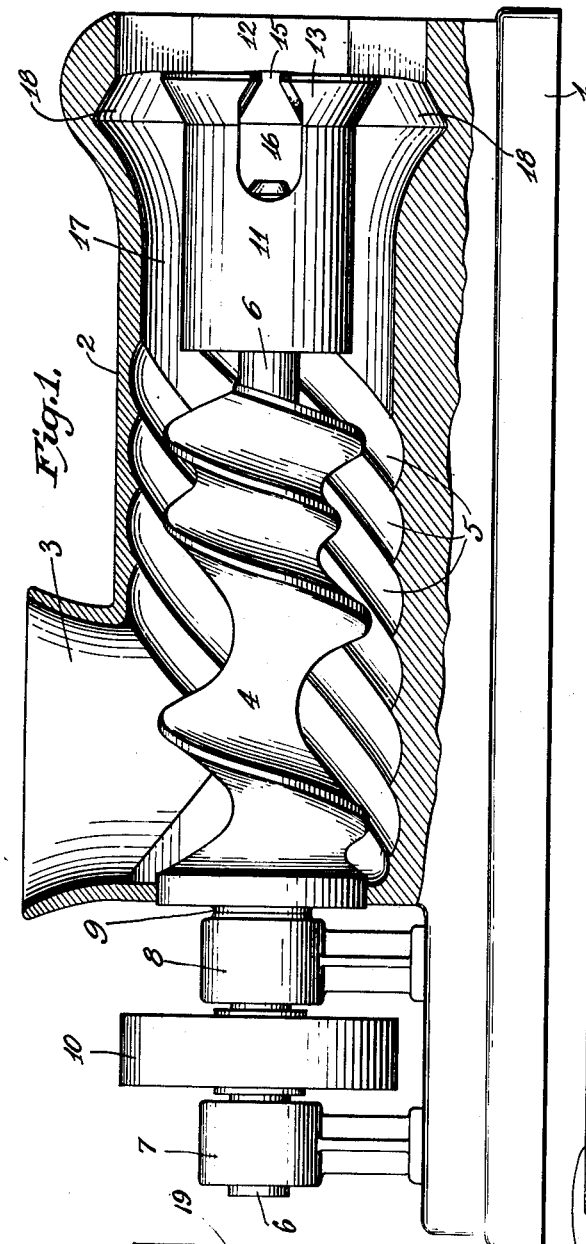
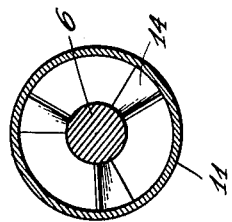
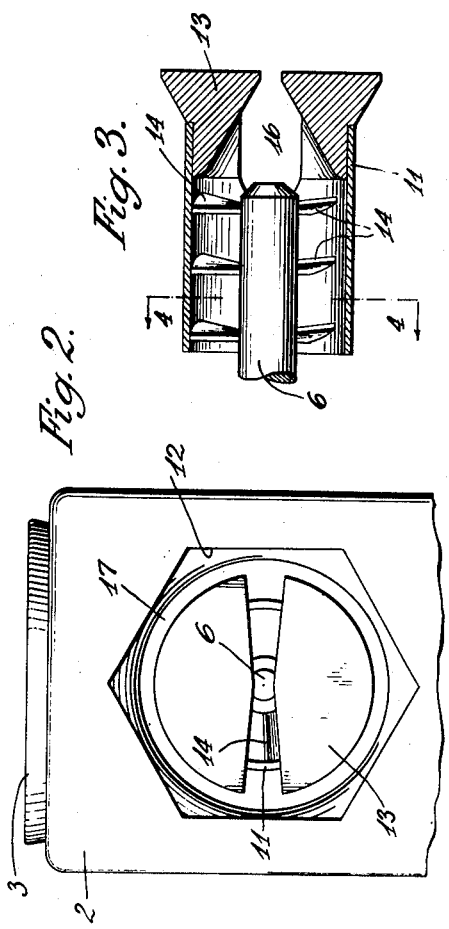
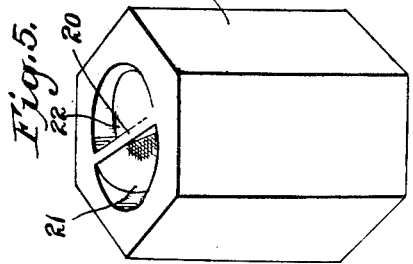
INVENTOR.
Edward H. R. Barton Patented Oct. 26, 1926.

1,604,799

UNITED STATES PATENT OFFICE.

EDWARD H. R. BARTON, OF ENGLEWOOD, NEW JERSEY.

EXTRUDING MACHINE.

Application filed June 26, 1922. Serial No. 570,984.

My invention relates to improvements in machines for making clay units for use as filling material for counter-current mixing or reaction spaces, by the extrusion method. It consists chiefly in the combination with a receiving hopper, feeding mechanism, etc., of a two-part die for forming the clay unit. This two-part die comprises a fixed outer portion and a rotatable centre portion, or hollow core, the object of which is to provide means for forming at one operation, a hollow clay block with one or more twisted or otherwise deformed partitions dividing the interior into crooked longitudinal chambers or passages.

I attain this object by the mechanism illustrated in the accompanying drawing in which—

Fig. 1 is side elevation with part of the body and of the fixed portion of the die, cut away so as to show the feeding mechanism and the rotatable centre portion, or hollow core, of the die, in place; Fig. 2, a partial end elevation showing the die; Fig. 3, a longitudinal section through the rotatable hollow core of the die; and Fig. 4, a cross section through the rotatable hollow core of the die, on line 4—4. Fig. 5 shows the product of my machine.

Similar numerals refer to similar parts throughout the views.

1 is the base and 2, the body of the machine. 3 is the hopper for receiving the clay. 4 is a screw for mixing the clay and forcing it out through the die. 5, 5, 5 are spiral grooves in the interior of the body, 2, of the machine, to assist in mixing and forcing out the clay. The screw, 4, is mounted on a shaft, 6, and is rotated by it. The shaft, 6, is supported in two pedestal bearings, 7 and 8. The bearing 8 is faced at 9 to take the thrust of the screw, 4. A pulley, 10, is mounted on shaft 6 by means of which the machine is driven. At the end of shaft 6 opposite from the pulley, 10, is mounted the rotatable hollow core of the die, 11. It is so mounted on the shaft that it will rotate within the opening, 12, of the die (which is shown hexagonal in Fig. 2). The rotatable hollow core of the die consists of a hollow body, 11, enlarged at the outer end, 13, and mounted on shaft 6 by means of spirally curved vanes, 14, 14, 14. These vanes are set at such an angle as to present only their edges to the moving clay and to cut through it and to impede its forward motion as little as possible. The end, 13, of the rotatable hollow core of the die, has a slot, 15, extending entirely across its face. This slot connects at both ends with openings 16, 16 in the body, 11, of the rotatable hollow core of the die. The space 17, 18 between the fixed and rotatable portions of the die is so proportioned as to regulate the relative quantities of clay flowing through the inside, and around the outside of the rotatable hollow core of the die, as will be explained later.

The "two-part die" through which the clay is extruded is made up of the body 2 and the rotatable hollow core 11. The opening in the "two-part die" which determines the shape of the extruded clay is the space 12 and the slot 15. The space 12 is the opening between the end of the body 2 and the enlarged end 13 of the rotatable hollow core 11.

The operation of the machine is as follows:—

The pulley, 10, is driven in a clockwise direction as viewed from the pulley end of the machine, by means of a belt, from some source of power. Clay in a plastic state, is introduced into the hopper, 3. The rotating screw, 4, thoroughly mixes the clay and forces it through the machine toward the die. When the clay reaches the rotating hollow core of the die it divides, some being forced inside and some around the outside of the cylindrical body, 11. The portion of the clay that follows the path through 17 and 18, is extruded through the opening, 12, of the die and forms the wall of a tube which is hexagonal on the outside and of circular section inside. At the same time, the portion of the clay that is forced in side the cylinder, 11, is extruded through the openings 16, 16 and through the slot, 15. That passing through the slot, 15, forms a twisted partition 20 across the cylindrical opening in the clay tube, while that passing through the openings 16, 16, mixes with the clay forming the wall of the tube and welds the partition to the wall at both sides. The shape and size of the passage at 17 and of the enlargement at 18 are such that just enough clay passes out through the openings 16, 16 to cause the clay forming the wall and that forming the partition to leave the die at exactly the same speed and to be securely welded together.

The shape and size of the die and its openings are immaterial to the principle and operation of the machine. The opening in the fixed portion of the die may be round, square or of any other section, so that it will form a tube of any desired exterior shape. The slot in the rotatable hollow core of the die, may be varied in size and shape in an infinite number of ways. It may extend only a part of the way across the face of the die and it may have branches or other irregularities so as to form an infinite variety of single or multiple twisted or otherwise deformed partitions dividing the interior into crooked longitudinal chambers. It is unnecessary and impracticable to attempt to illustrate the great variety of shapes of slot that might be used. The operation of the machine is the same for all.

Fig. 5 shows the product of my machine, in the shape it would be formed by the machine and dies as illustrated and described. The body, 19, of the tube is formed of clay which has been forced through passages 17 and 18 and extruded through the opening, 12, of the die. The partition, 20, is formed of clay that has been forced inside the cylinder and extruded through the slot, 15. This partition is twisted because the slot, 15, in the end of the hollow cylindrical core, 11, is rotated as the clay is extruded from it. Longitudinal, spiral passages on each side of the twisted partition are shown at 21 and 22.

The product, namely the hollow tile with the winding or helical vane therein, as produced by the operation of the machine, is not claimed herein but in a copending application, Serial No. 138,323 filed September 28, 1926.

As an infinite variation in the shape and proportions of the parts may be made and the same objects attained in substantially the same manner, I do not desire to be limited to the particular mechanism shown; but

What I claim as my invention, and desire to secure by Letters Patent, is—

1. The combination, in an extruding machine, of a die having a rotatable hollow core, with a chamber for holding the material to be extruded and means for forcing said material through said die, part of it through, and part around said hollow core, substantially as, and for the purposes set forth.

2. The combination, in an extruding machine, of a die having a rotatable hollow cylindrical core open at the internal end and partially closed at the external end, with a chamber for holding the material to be extruded and means for forcing said material through said die, along the walls of said cylindrical core both inside and outside said walls, substantially as, and for the purposes set forth.

3. The combination, in an extruding machine, of a die having a rotatable hollow cylindrical core open at the internal end and partially closed at the external end, with a chamber for holding the material to be extruded, said chamber being so shaped and proportioned as to properly direct and proportion the relative quantities of material flowing respectively through the inside, and around the outside of the cylindrical walls of said hollow core of the die; and means for forcing said material through said die, substantially as, and for the purposes set forth.

4. The combination, in an extruding machine, of a die having a rotatable hollow core open at the internal end and closed at the external end with the exception of an open slot or slots extending partly or wholly across the external end of said hollow core, with a chamber for holding the material to be extruded and means for forcing said material through said die, substantially as, and for the purposes set forth.

5. The combination, in an extruding machine, of a die having a rotatable hollow core open at the internal end and closed at the external end with the exception of an open slot or slots of irregular shape extending partly or wholly across the external end of said hollow core, with a chamber for holding the material to be extruded and means for forcing said material through said die, substantially as, and for the purposes set forth.

EDWARD H. R. BARTON.